April 23, 1968     E. LINDKVIST     3,379,624
PROCESS AND EQUIPMENT FOR THE MANUFACTURE OF PURE POLYALCOHOLS
Filed July 10, 1964     2 Sheets-Sheet 2

*INVENTOR.*
Eirik Lindkvist
By: Stevens, Davis, Miller + Mosher
Attorneys

United States Patent Office 3,379,624
Patented Apr. 23, 1968

3,379,624
PROCESS AND EQUIPMENT FOR THE MANU-
FACTURE OF PURE POLYALCOHOLS
Eirik Lindkvist, Perstorp, Sweden, assignor to Perstorp
Aktiebolag, Stockholm, Sweden
Filed July 10, 1964, Ser. No. 381,817
Claims priority, application Sweden, May 14, 1964,
5,885/64
10 Claims. (Cl. 203—77)

ABSTRACT OF THE DISCLOSURE

Polyalcohols prepared in alkaline solution are purified, and after neutralizing the solution, are passed through a thin film evaporator in which sodium formate and the like is separated from the bottom of the evaporator. The vapors from the evaporator are subjected to two distillation stages. In the first distillation stage, lower boiling byproducts are removed as overhead, and the polyalcohol and higher boiling byproducts are passed to the second distillation stage in which the polyalcohol is separated from higher boiling byproducts.

---

Figure 1:
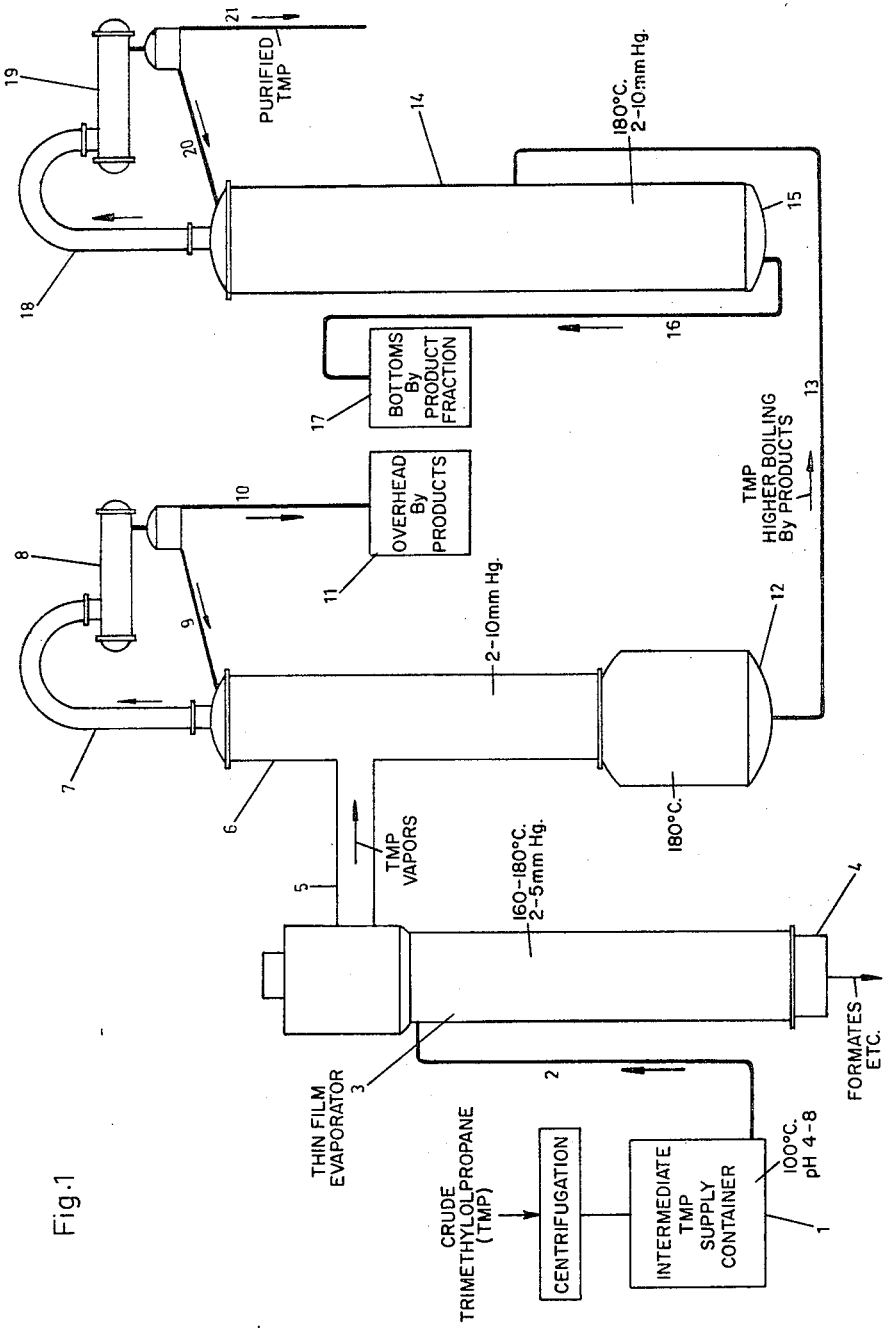

The polyalcohols employed in this invention are primarily trimethylolpropane (TMP), trimethylolethane (TME), tetramethylolcyclohexanol (TMC) and anhydroenneaheptitol (AEH).

The purifying of the polyalcohol obtained on vacuum evaporation of the synthesized product has up to now been carried out mainly by crystallization or distillation. The extraction is usually performed by means of alcohols, ketones or esters as solvents. This solvent must be volatilized afterwards, which means an economical burden. In another purification process the evaporated polyalcohol is centrifuged at sufficiently high temperature, e.g. 70–100° C., to separate the polyalcohol as a low viscosity liquid. The alcohol is then diluted with water and is passed through an ion exchanger for further purifying. This process is described in detail in the Swedish Patent No. 181,290. Still another process for purifying polyalcohols relates to a process in which the alcohol, which has been purified by centrifuging and ion exchanging, is submitted to fractional distillation to obtain highly pure alcohol in a good yield. Since these processes are all continuous, the polyalcohol must stay for a very long time at high temperature, e.g. 12 hours at 180° C. during the fractional distillation. This very long hold-up causes many practical disadvantages and additionally gives rise to thermal decomposition (cracking), discoloration of the product etc., which leads to a product of bad quality.

In accordance with the present invention the purification of the described polyalcohols obtained by the described synthesis is accomplished by a process which comprises continuously evaporating the raw polyalcohol in a rapid evaporator and thereafter fractionally distilling the vaporized product to remove a lower and a higher boiling fraction and to recover a polyalcohol of greatly improved purity. Optionally the raw polyalcohol can be preliminarily purified by evaporation and centrifugation. During the first step the polyalcohol is separated from remaining sodium or calcium formate together with other possible impurities, e.g. very heavy organic fractions, in a rapid evaporator such as a thin layer evaporator and the polyalcohol is thereafter purified by fractional distillation. As above mentioned the raw polyalcohol contains even after the centrifuging a substantial amount of sodium or calcium formate, which in prior art methods was separated by extraction or by ion exchanging. According to the present invention this sodium or calcium formate is separated from the alcohol in a rapid evaporator of special construction, so that the ion exchangers and the extraction apparatus can be discarded.

The rapid evaporator according to the invention is preferably a so-called thin layer or film evaporator. Such evaporators are constructed for separating liquids from each other. It has therefore been necessary to change the construction of the thin layer evaporator so that it can separate solids from liquids as required in the purification of the present invention.

The raw polyalcohol, such as TMP manufactured by condensation of butyraldehyde and formaldehyde in alkaline conditions, is neutralized before evaporating and centrifuging and is thus also neutral at the input into the rapid evaporator. The pH of the solution after neutralizing is regulated to approximately 4–8, preferably 5–6. Any further preliminary treatment of the raw neutral TMP to make this suitable for treatment in the thin layer evaporator is not required.

Figure 2:
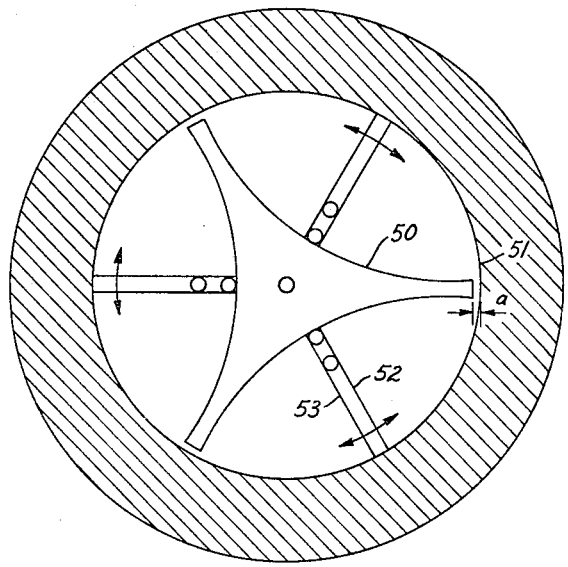
Figure 3:
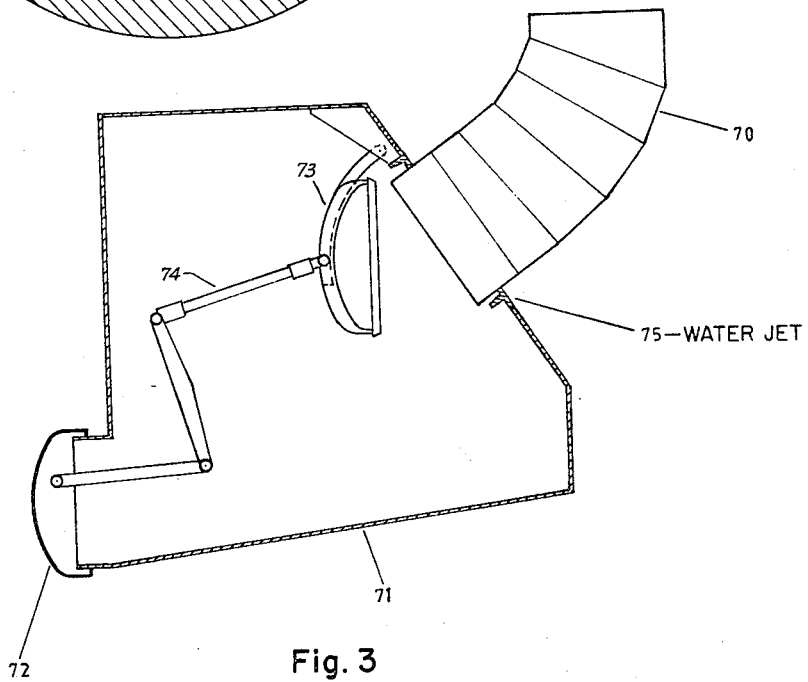

The invention will be more fully described in connection with the attached drawings, in which FIG. 1 is a flow diagram of apparatus for manufacturing TMP, FIG. 2 is a horizontal, sectional view of a thin layer evaporator according to the invention, and FIG. 3 illustrates a feeding out device from the thin layer evaporator.

The raw polyalcohol, in this case TMP, is contained in the intermediate container 1, which is held warm, e.g. 100° C. by means of heating coils (not shown) to keep the TMP in the liquid state. From the intermediate container 1 the raw TMP is sucked via conduit 2 into the thin film evaporator 3, in which sodium or calcium formate and possibly other heavy constituents such as dimers of TMP are separated and fed out through the feeding out device 4. From the evaporator 3 a clear vapour of TMP is fed out through conduit 5. The temperature in the evaporator is conveniently maintained within the range of 160–180° C. and the pressure is maintained within the range of 2–5 mm. Hg. The thin layer evaporator is heated in a common way for example by circulating a heat transferring liquid, e.g. Dowtherm, in the surrounding jacket of the evaporator.

The amount of sodium or calcium formate, which is fed out of the bottom part of the evaporator, amounts up to approximately 4%, calculated on the TMP. This amount, however, may be considerably changed depending on whether the raw polyalcohol has been centrifuged in advance or not. It may in unfavourable cases amount up to 50%. The sodium or calcium formate may be dry or white or it may have a dark appearance, which is due to organic constituents. Usually this solid mixture comprises 4% by weight of each of the constituents sodium or calcium formate and organic substances calculated on the raw polyalcohol. The hold-up time for the TMP in the thin layer evaporator is calculated to be about 10–60 seconds. The TMP vapour coming through the conduit 5, which vapour contains lighter and heavier fractions besides the TMP, is conducted into a distillation column 6, which is filled with filler bodies, e.g. saddle bodies. In this column 6 the lighter fractions are separated from the TMP and are conducted via the pipe 7 to the condenser 8, from which one part is returned via the conduit 9 to the column 6, and another part is conducted via the conduit 10 to the receiver 11. The light fraction, which is gathered in the receiver 11, amounts to about 2–6% by weight calculated on the raw polyalcohol. The column is heated in any common way for example by circulating a part of the liquid at the bottom through a heat exchanger. The pressure in the distillation column is maintained within a range of 2–10 mm. Hg and the temperature in the bottom part of the column is maintained at approximately 180° C. The water temperature in the condenser is conveniently about 70° C. The TMP, which has been freed from the light constituents, is gathered in the bottom part 12 of the column and is fed via the conduit 13 to another column 14, in which the TMP is separated from the heavier constituents, which are gathered in the bottom part 15 and are pumped continuously via the pipe 16 to the receiver 17. This afterfraction amounts to approximately 6–10% by weight calculated on the raw polyalcohol. Also this column is filled with filler bodies, and the pressure is maintained within approximately 2–10 mm. Hg and the temperature is about 180° C. The vaporized TMP is fed out via the conduit 18 and is condensed in the condenser 19, from which one part of the TMP is returned to the upper part of the column via the conduit 20, while another part is conducted via the conduit 21 to an intermediate container or the like. Finally the TMP is optionally flaked in a conventional apparatus.

The pre-fraction and the afterfraction, which are stored in the receivers 11 and 17, respectively, may afterwards, if desired, be further purified separately to collect the amount of TMP contained in these fractions.

The TMP manufactured by this process is of a very high quality. It has a colour number, which may be as low as 0 APHA. As a comparison it may be mentioned that usual, commercially available TMP, has a colour number of 20–100 APHA. The phthalic acid melt is also unusually light having a value of 1–3, measured in the colour scale JSK 1510 (Japanese colour scale). The yield of pure TMP obtained by the process according to the present invention is higher than the one obtained by prior art methods and comprises up to approximately 85–90% calculated on the basis of the starting materials formaldehyde and butyraldehyde.

It is preferred to perform the continuous purifying process according to the present invention by using a thin layer evaporator as a rapid evaporator. The not unsubstantial amount of sodium and calcium formate, which is included in the solution, however, causes great difficulties if conventional thin layer evaporators adapted for separating only liquids from each others are employed. These are constructed with a very small distance, usually approximately 0.1 mm., between the rotor blades and the inner wall. According to present invention this problem has been solved by making this distance appreciably larger, approximately 1–5 mm., and by providing scraper blades on the rotor for scraping off the salt from the inner wall. This is shown in FIG. 2, in which the rotor is indicated by 50 and inner wall by 51. The distance between the rotor and the inner wall is indicated by the letter $a$. The rotor blades 52 are pivotally suspended in a ring 53. By the action of the centrifugal force they will scrape against the wall. The rotor is normally rotated at 700–800 r.p.m. Since the evaporation in the thin layer evaporator is taking place under a very high vacuum, the sodium or calcium formate together with other solid substances therefore has to be sluiced out from the bottom of the thin layer evaporator. Suitable device for this purpose is shown in FIG. 3. The solids fall via a pocket 70 down into a space 71. The exit from this space is maintained closed by means of a vacuum tight closure 72. The closure 73 is closed when the closure 72 must be opened for the removal of solids in order to maintain the vacuum in pocket 70. Additional solids are thus allowed to be gathered in the pocket 70 during the removal of solids from space 71. The closure 73 is inclined in its closed position, while the closure 72 is arranged vertically. The opening of the closures 72 and 73 is carried out by means of a programmed device 74. A water jet 75 is arranged for facilitating the emptying of the space 71 by rinsing out the solids. Thus, by means of this device, the solids can be fed out without disturbing the function of the thin layer evaporator.

The advantages, which are obtained by the present invention, in addition to the ones mentioned above, are the very substantial economic advantages gained by avoiding the need for ion exchangers, the necessity to dilute the solution, the necessity to extract the product and similar preliminary purifications. The invention has been described above in connection with a conventional process for manufacturing polyalcohols by which the water and the major part of the solids have been removed in advance. However, it is evident for those skilled in the art that the invention can be adapted also for purifying polyalcohols manufactured in other ways.

The invention is not limited to the embodiment shown but can be modified in different ways within the scope of the invention.

I claim:

1. In a process for the manufacture of a pure polyalcohol selected from the group consisting of trimethylolpropane, trimethylolethane, tetramethylolcyclohexanol, and anhydroenneaheptitol, by reaction in alkaline media using formaldehyde, the steps which comprise continuously separating the raw polyalcohol from solid impurities in a thin film evaporator maintained at a pressure of about 2 to 5 mm. Hg and a temperature of about 160° to 180° C., removing and condensing the crude polyalcohol overhead, continuously distilling the condensed product from the evaporator to remove a lower boiling by-product fraction, continuously re-distilling the bottoms product of said distillation, and recovering a distillate of pure polyalcohol and a higher boiling by-product fraction, said distilling and redistilling being conducted at a pressure of about 2 to 10 mm. Hg and a temperature of about 180° C.

2. The process of claim 1 wherein the raw polyalcohol is preliminarily purified by evaporation and centrifugation.

3. The process of claim 1 wherein the polyalcohol is trimethylolpropane.

4. The process of claim 1 wherein the hold-up time in the evaporator is from 10 to 60 seconds.

5. The process of claim 1 further comprising carrying out the thin film evaporation and the two distillation steps in series without the intervening introduction of substances to modify the pH.

6. The process of claim 3 wherein the trimethylolpropane to be purified is at a pH of 4 to 8, and at a temperature of about 100° C.

7. The process of claim 3 wherein about 4% of solid by-product is separated in the evaporator, 2 to 6% of by-product is separated in the first distillation and 6 to 10% of by-product is separated in the second distillation, said percentages being based on the weight of the polyalcohol charged.

8. A vacuum purification train for the purification of polyalcohols selected from the group consisting of trimethylolpropane, trimethylolethane, tetramethylolcyclohexanol, and anhydroenneaheptitol, obtained by reaction in alkaline media using formaldehyde comprising, in series, a thin-layer evaporator, and a first and a second distillation column, means for maintaining the evaporator at a pressure of about 2 to 5 mm. Hg and a temperature of about 160° to 180° C., means for maintaining the first and second distillation columns at a pressure of about 2 to 10 mm. Hg and a temperature of about 180° C., means for feeding vapors from said evaporator to said first distillation column, means for removing solid by-products from said evaporator, means for condensing overhead distillate from said first distillation column, means for feeding the undistilled product from said first distillation column to said second distillation column, and means for condensing the purified polyalcohol from said second distillation column.

9. The purification train of claim 8 wherein the distance between the rotor and the evaporator wall of the thin layer evaporator is between 1 to 5 mm., and the rotor contains pivotally suspended scraper blades for said wall.

10. The purification train of claim 8 wherein the means for removing said solid by-product comprises a sealed chamber, a sleeve connecting said chamber with the thin layer evaporator, means for sealing said chamber from said sleeve, means for opening and sealing an outlet from said chamber, means operatively connecting said sealing means to control the simultaneous opening of one and closing of the other, and a jet for rinsing out solids in said chamber.

References Cited

UNITED STATES PATENTS

| | | | |
|---|---|---|---|
| 2,837,468 | 6/1958 | Ruhf | 260—637 X |
| 2,930,818 | 4/1960 | Wust | 260—635 X |
| 3,183,274 | 5/1965 | Robeson | 260—635 |
| 3,259,662 | 7/1966 | Munley | 260—635 |

NORMAN YUDKOFF, *Primary Examiner.*

D. EDWARDS, *Assistant Examiner.*

UNITED STATES PATENT OFFICE
CERTIFICATE OF CORRECTION

Patent No. 3,379,624                        April 23, 1968

Eirik Lindkvist

It is certified that error appears in the above identified patent and that said Letters Patent are hereby corrected as shown below:

In the heading to the printed specification, line 5, "Stockholm" should read -- Perstorp --.

Signed and sealed this 3rd day of February 1970.

(SEAL)
Attest:

Edward M. Fletcher, Jr.
Attesting Officer

WILLIAM E. SCHUYLER, JR.
Commissioner of Patents